United States Patent

Mitkov et al.

[11] Patent Number: 5,017,177
[45] Date of Patent: May 21, 1991

[54] MAIZE SHELLER

[75] Inventors: Atanas L. Mitkov; Ivan N. Georgiev; Atanas K. Atanassov; Peter T. Radulov; Iliya Y. Stoyanov, all of Russe, Bulgaria

[73] Assignee: VTU "Angel Kantchev", Russe, Bulgaria

[21] Appl. No.: 416,884

[22] Filed: Oct. 4, 1989

Related U.S. Application Data

[63] Continuation-in-part of Ser. No. 197,059, May 13, 1988.

[30] Foreign Application Priority Data

Feb. 3, 1987 [BG] Bulgaria ................................ 78312

[51] Int. Cl.⁵ .............................................. A01F 12/26
[52] U.S. Cl. .................................... 460/46; 460/62
[58] Field of Search ............................. 460/46, 62, 76

[56] References Cited

U.S. PATENT DOCUMENTS

| | | | |
|---|---|---|---|
| 2,325,654 | 8/1943 | Borchers | 460/46 |
| 2,484,228 | 10/1949 | Isay | 460/46 |
| 2,681,065 | 6/1954 | Worden | 460/62 |
| 3,844,293 | 10/1974 | Young | 460/62 X |
| 4,532,940 | 8/1985 | Mitkou et al. | 460/23 |

OTHER PUBLICATIONS

"Inventions, Trademarks and Industrial Designs Bulletin No. 3," 1989.

Primary Examiner—William P. Neuder
Attorney, Agent, or Firm—Klein & Vibber

[57] ABSTRACT

The present invention relates to a maize sheller having at least one drum and counter drum (concave). The counter drum has an adjustable part and a non-adjustable part. The maize sheller according to the invention possesses a regulating mechanism for regulating clearance between the drum and the adjustable part of the counter drum. The use of a counter drum of such a construction economizes a significant amount of metal and enhances the screening capacity and the productivity of the entire device. The regulation of the outlet aperture within a comparatively wide range permits the use of the maize sheller for shelling corn cobs of different sizes and with different moisture content without causing damage to the grain. In case of penetration of foreign matter into the shelling apparatus, the drum and the counter drum are protected against deformation by a safety sector which is automatically opened.

4 Claims, 6 Drawing Sheets

MAIZE SHELLER

This application is a continuation-in-part of application Ser. No. 197,059, filed May 13, 1988.

FIELD OF THE INVENTION

The invention relates to a maize sheller which can be used either separately or included in an "assembly line" for shelling, drying and cleaning the maize in agricultural enterprises, the lines for drying and calibrating hybrid maize for sowing seed included.

BACKGROUND OF THE INVENTION

A device for maize shelling is known, consisting of a supporting frame with a receiving hopper in its upper part. Under the hopper, there are consecutively arranged: a pair of cylindrical drums having conical counter drums (concave) fitted around the cylindrical drums, screens connected with a fan and a chute for bringing out the impurities, the shelled corn cobs and the grain. The counter drum is oriented with its bigger base towards the receiving hopper. The lateral surfaces of the drum and the counter drum are formed by rods. The drum rods are arranged upon a tube along a helicoidal line and are equidistant one from another. The counter drum rods are arranged along the generatrix of the cone.

The disadvantages of the known maize shelling device are as follows: The counter drum is monolithic with a constant cone angle; no means of protection are provided in the event foreign matter enters the drum; and the clearance between the drum and counter drum is regulated by shifting the counter drum in relation to the frame. On one hand, this imposes the need for a relevant seal in the storage part of the counter drum and, at the opposite end, an extension of the counter drum. This results in an over consumption of metal, so much greater as the regulating ranges of the clearance are greater. On the other hand, the constant cone angle of the counter drum and the limited possibility for shifting the counter drum in relation to the frame lead to a decreased amount of grain traversing the counter drum and reduce the ability of the device to operate under varied conditions of moisture and corn cob sizes.

An object of the present invention is to create a maize shelling device having a greater productivity, small power consumption and minimal micro and macro damaging of the grain under a wide range of working conditions of moisture and sizes of the corn cobs.

SUMMARY OF THE INVENTION

The inventive maize shelling device comprises a supporting frame with a receiving hopper; at least two cylindrical rod drums, each having a conical rod counter drum encompassing it, the conical counter drum having its bigger base oriented towards the receiving hopper; screens and a fan connected to a chute for the removal of the grain, the shelled corn cobs and the impurities. The rods of the drums and of the counter drums are arranged along the helicoidal line. Upon at least one of the rods is fixed a second rod skewed (tapered) on its tail end.

According to the invention, the counter drum comprises a non-adjustable part fixed to the frame and an adjustable part comprising at least three sectors, linked by an articulation joint to the small base of the non-adjustable part of the counter drum and linked together at their other (tail) end through a regulating means for regulating the clearance between the cylindrical drum and the adjustable part of the counter drum. The rods of the cylindrical drum and the counter drum fitted along the helicoidal line from angles of from 0 to 50 degrees with the generatrices of the cone and the cylinder, respectively.

According to a preferred embodiment of the invention, the outlet clearance between the rods of the cylindrical drum and the rods of the adjustable part of the conical counter drum ranges from 20 to 35 mm.

The regulating means preferably comprises a flange disposed immediately behind the adjustable part of the counter drum. The flange is driven by profiled rollers, engaged by bearings in the frame. Eccentrically disposed slot shaped orifices are arranged in the flange. The tail end of the sectors forming the adjustable part of the counter drum are clamped immovably to regulating pins and these pins engage the slot shaped orifices of the flange. Thereby, rotation of the flange causes the pins to travel in the slots moving the tail end of the sectors of the adjustable part closer to or farther away from the cylindrical drum.

In order to overcome unfavorable stress in the event foreign matter penetrates into the non-adjustable part of the counter drum, a breakdown sector is provided where one side is linked by an articulation joint and the other side by means of a security pin (frangible release means).

The advantages of the maize sheller according to the invention are that by using a complex counter drum, a significant amount of metal is economized and the suitable disposition of the rods upon the lateral surface of the counter drum enables the enhancement of its screening capacity and thus the productivity of the entire device. The regulation of the outlet orifice within a comparatively wide range allows the use of the maize sheller with corn cobs possessing varied moisture content and varied sizes without causing damage to the grain.

In case foreign matter penetrates into the shelling apparatus, the drum and the counter drum are protected against deformation owing to the safety sector which is automatically opened by breaking of a security pin.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
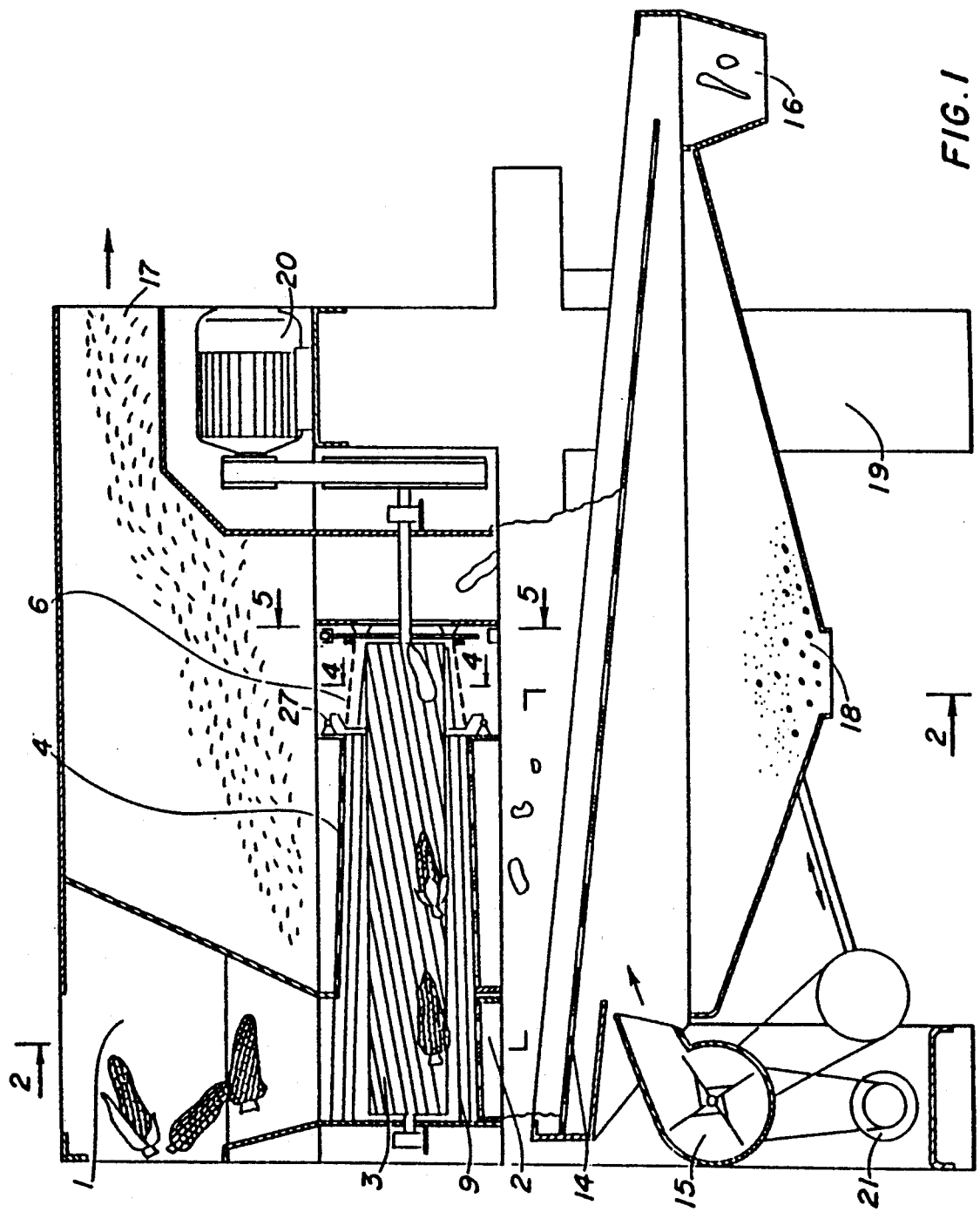
FIG. 1 is a longitudinal section of the maize sheller.

Referring now to FIG. 1, the maize sheller according to the invention comprises a receiving hopper 1, a conical rod counter drum 2 with a cylindrical rod drum 3 coaxially residing therein. The counter drum 2 comprises a non-adjustable part 4 and an adjustable part 6, the non-adjustable part 4 having its bigger base oriented towards the receiving hopper 1.

A preferably replaceable screen 14 is fitted under the counter drum 2 and under the screen 14, is preferably a fan 15. Chute 16 located at one end of the screen 14 is designed to remove the large size impurities. Chute 17, above the drums, is provided to remove the small size impurities and chute 18 collects the grain.

All these components are preferably mounted on a supporting frame 19 in their operating sequence. Drum 3 is driven by electromotor 20, while the fan 15 is driven by electromotor 21.

A plurality of drum arrangements as described above can be advantageously arranged between the hopper 1 and the screen 14.

Figure 2:
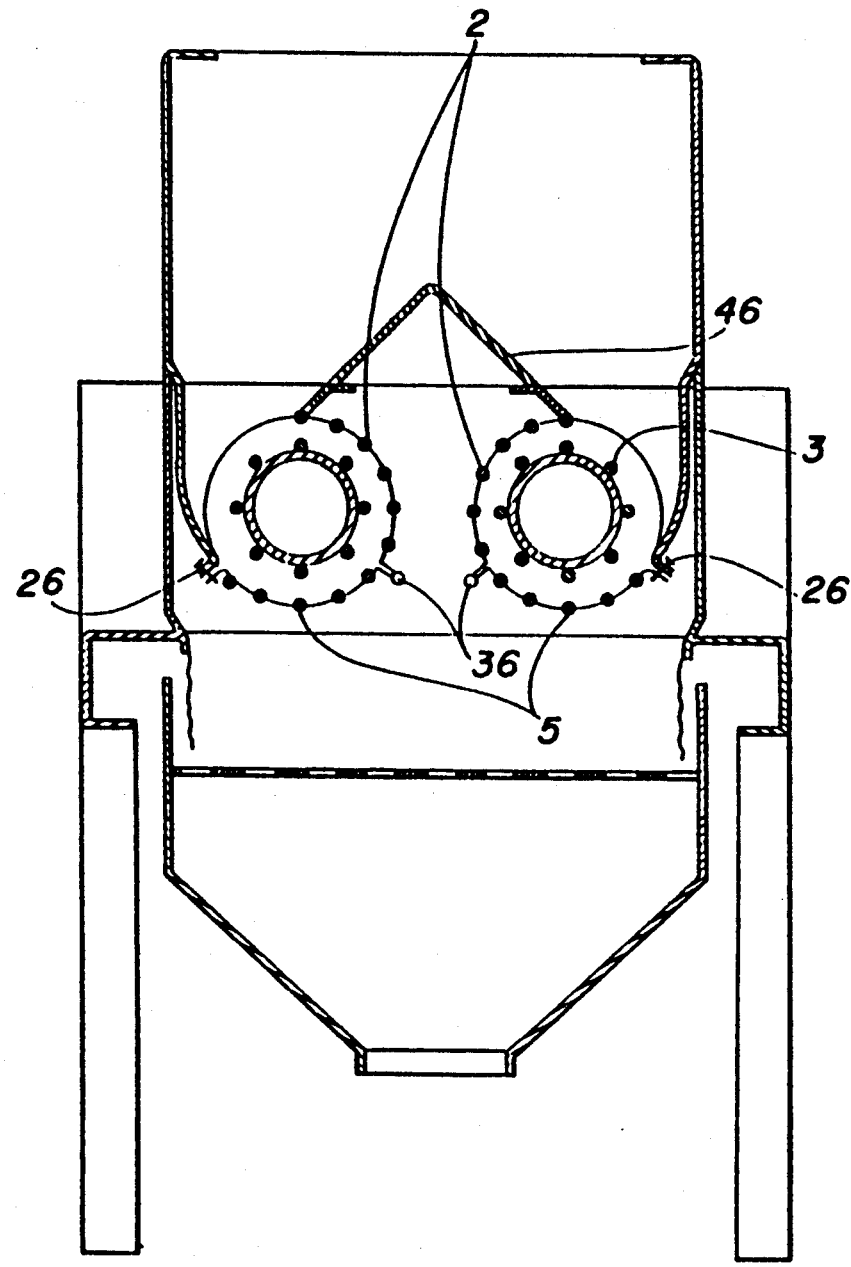
FIG. 2 is a cross section along line A—A of FIG. 1 showing the non-adjustable part of the counter drum and the safety sector.

FIG. 2 shows how a plurality of drum arrangements can be organized. It will be noted that a portion of the surface of counter drum 2 is discontinued and mated with guiding means 46 to direct corn cobs from the hopper 1 into the space between drums 2 and 3. It can also be seen that in the lateral surface of the non-adjustable part 4 of the counter drum 2, a safety sector 5 is formed, linked by an articulation joint 36 from the one side and by means of a security pin 26 from the other side.

Figure 4:
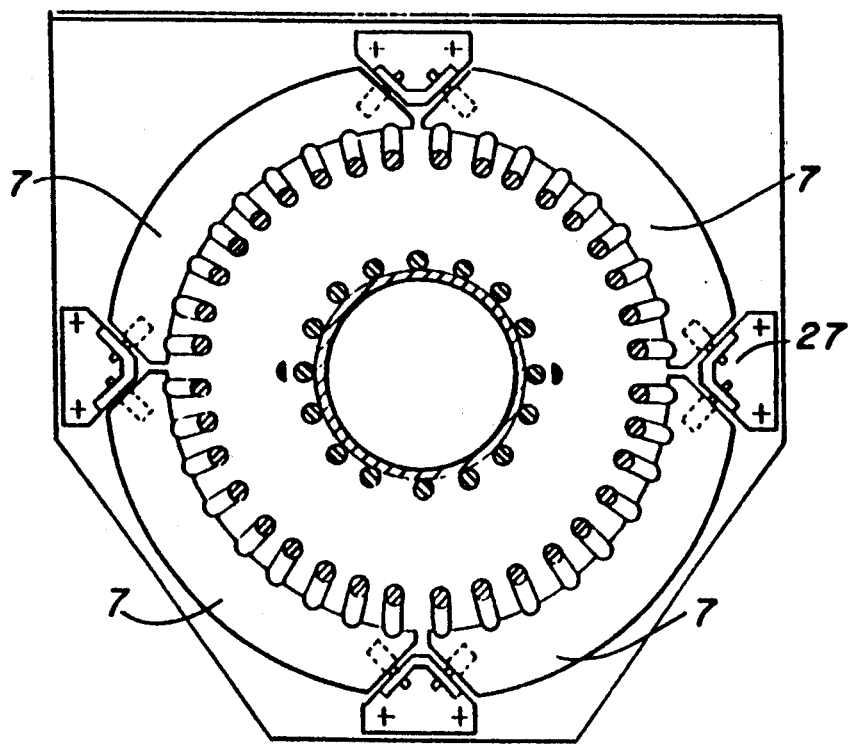
FIG. 4 is cross section along line B—B of FIG. 1 showing the fastening of the adjustable part to the non-adjustable part of the counter drum.
Figure 5:
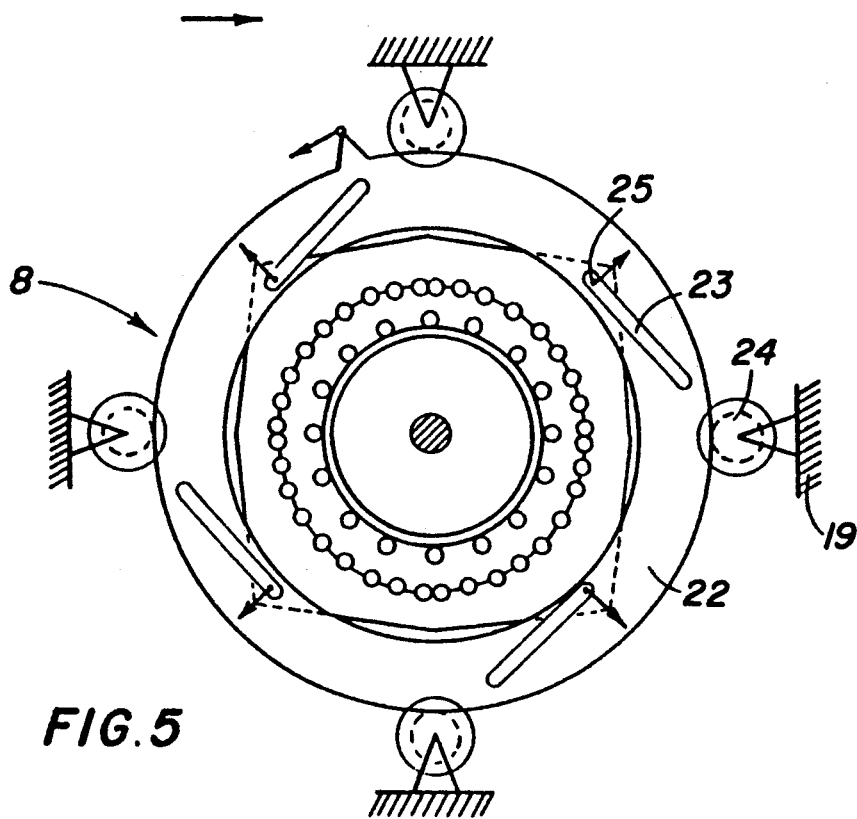
FIGS. 5 and 6 are schematic views representing the two extreme positions of the clearance regulating means as seen along line C—C of FIG. 1.
Figure 6:
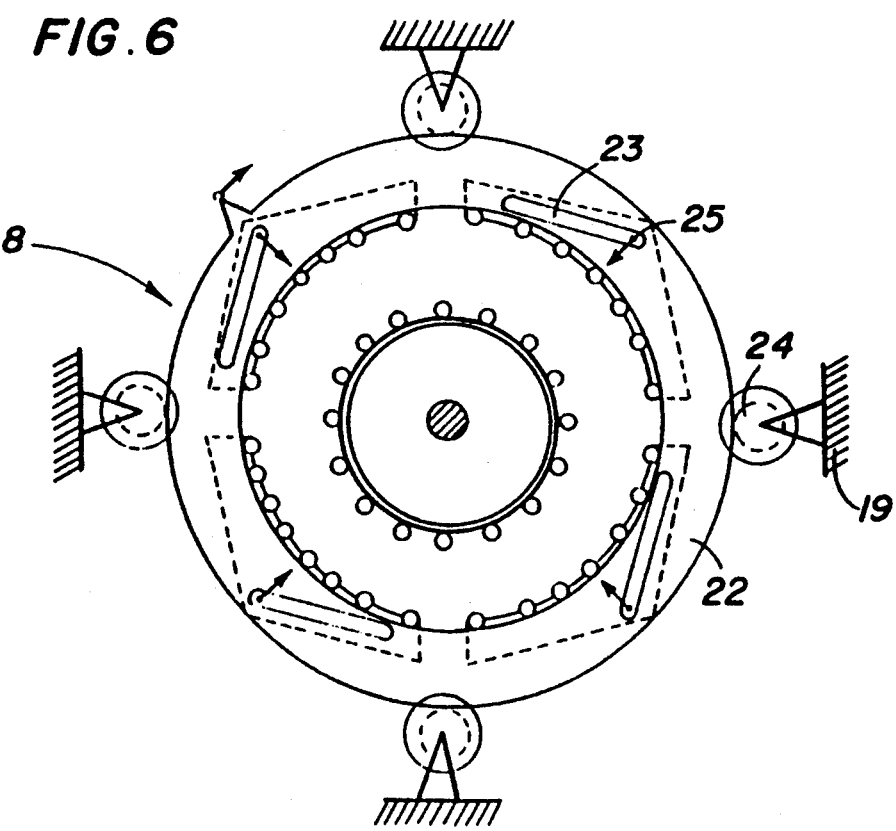
Figure 7:
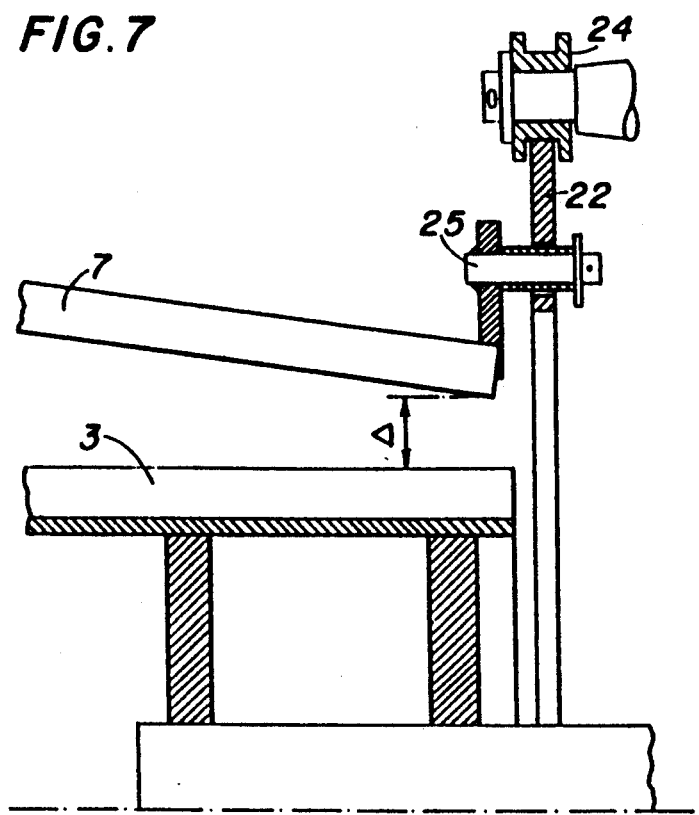
FIG. 7 is a schematic view of the connection between the sectors and the flange as seen along line E—E of FIG. 9.

As seen in FIGS. 4–7 and 9, the adjustable part 6 of the counter drum 2 comprises at least three sectors 7 (FIGS. 4–6 show four sectors) of rods 9. The sectors 7 are linked to the non-adjustable part 4 of drum 2 by articulation joints 27 (FIG. 4) and linked together at their tail end to a regulating means (FIGS. 5, 6, 7 and 9) for regulating the clearance between the drum 3 and the adjustable part 6 of the counter drum 2. The clearance is regulated within the range of from 20 to 35 mm.

Figure 8:
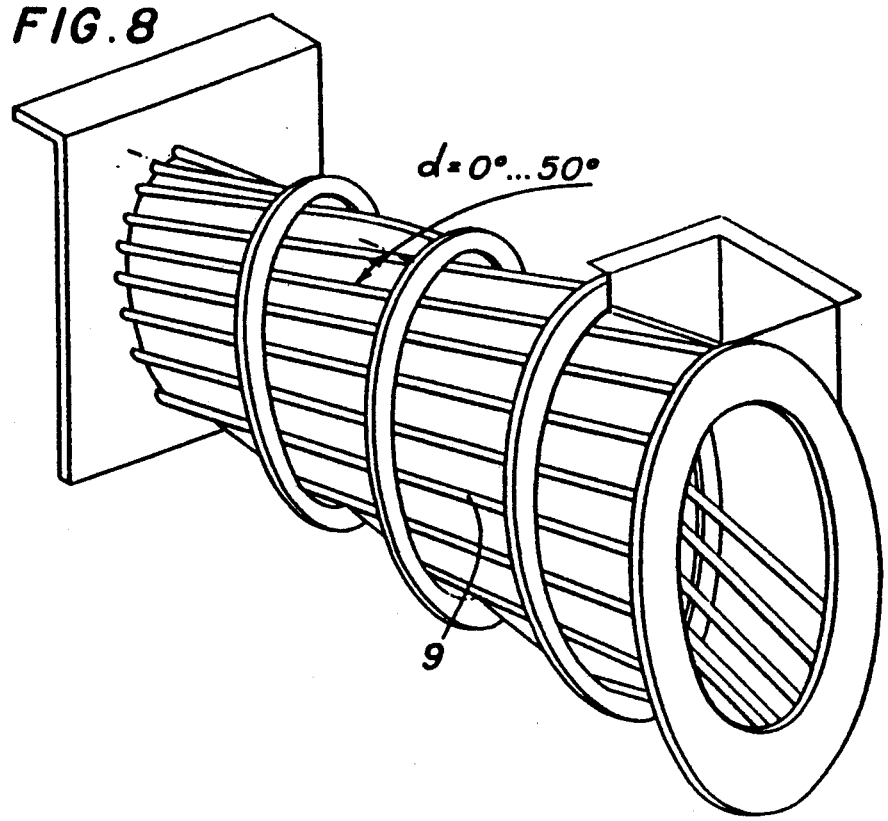
FIG. 8 is an outside view of the counter drum.

As seen in FIG. 8, the rods 9 of the counter drum 2 are disposed along a helicoidal line forming with the generatrix of the cone an angle [alpha] ranging from 0 to 50 degrees.

Figure 3:
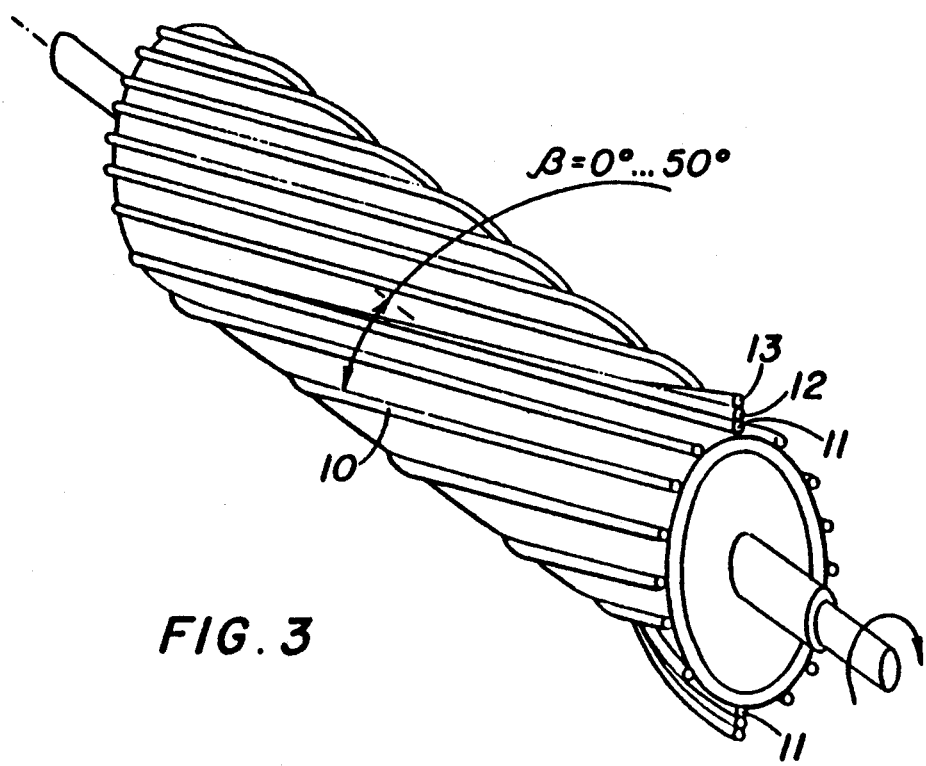
FIG. 3 is a perspective view of the drum.

As seen in FIG. 3, the rods 10 of the drum 3 are disposed along a helicoidal line forming with the generatrix of the cylinder an angle [beta] of from 0 to 50 degrees. Upon two rods opposite 11 of the drum 3, in the zone of the receiving hopper 1, are disposed one or two guiding rods 12 or 12 and 13 tapered in the direction of the cone of the drum 2.

Referring now to FIGS. 5, 6, 7, 9, and 10, the regulating means 8, for regulating the clearance between the drum 3 and the adjustable part 6 of the counter drum 2, comprises a flange 22 disposed frontally immediately behind the adjustable part 6 of the counter drum 2 and set against with its periphery in the grooves of four profiled rollers 24 mounted in the frame. The flange 22 is mounted with respect to the profiled rollers 24 in a manner enabling free rotation around its axis. In the flange 22 are eccentrically shaped and disposed slot shaped orifices 23 in which reside regulating pins 25 clamped immovably to the corresponding sector 7.

Figure 9:
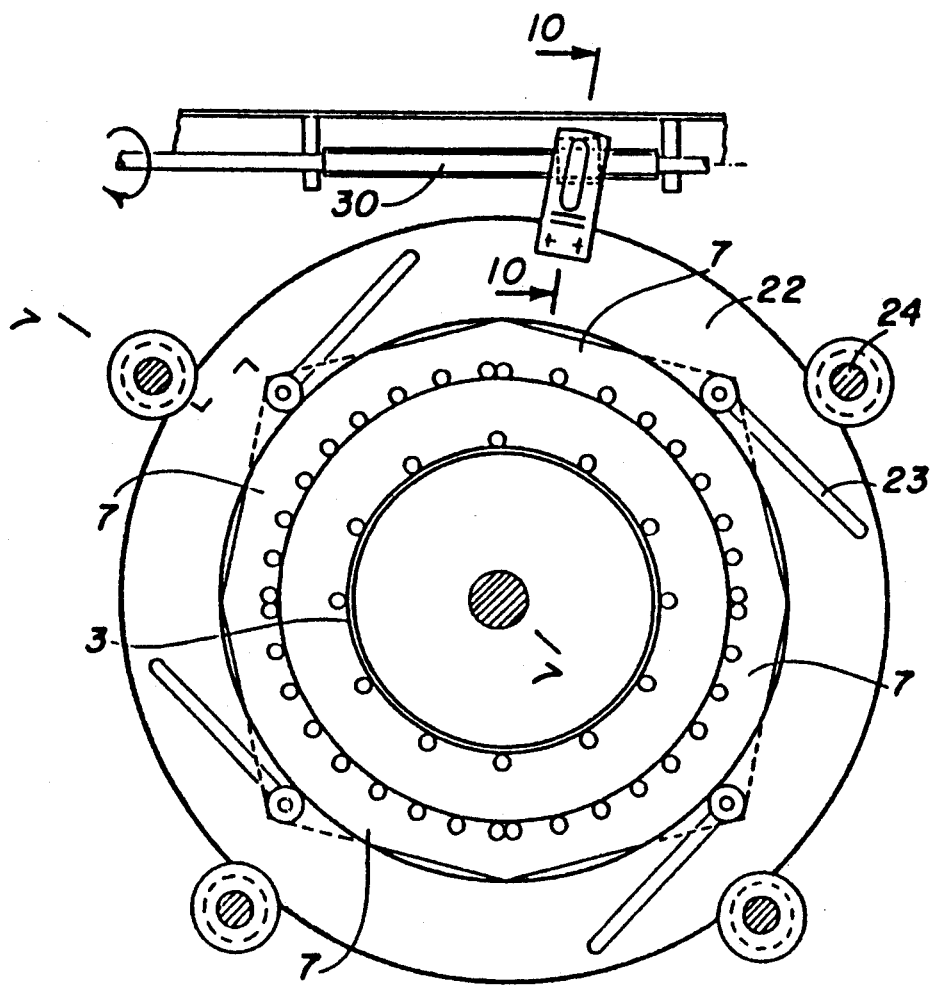
FIG. 9 is a schematic view of one embodiment of the regulating means, similar to FIG. 5 as seen along line C—C of FIG. 1.
Figure 10:
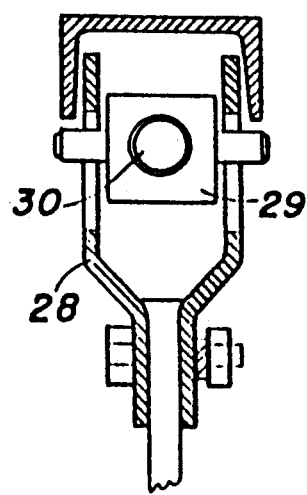
FIG. 10 is a cross section along line D—D of FIG. 9.

In a preferred embodiment shown in FIGS. 9 and 10, a fork 28 is fixed to a portion of flange 22. Fork 28 carries nut 29 which is engaged by screw 30. On rotation of screw 30, nut 29 is moved along the length of screw 30 and thus moves fork 28 and rotates flange 22. Rotation of flange 22 causes regulating pins 25 to slide in slot shaped orifices 23 and thereby move the tail sectors 7 of the adjustable part to move as shown in the figures. FIG. 5 shows the sectors 7 moved in and FIG. 6 shows the sectors 7 moved out.

MANNER OF OPERATION

The maize sheller according to the invention operates as follows: the corn cobs are fed into the receiving hopper 1. From the receiving hopper they enter the space between the drums 3 and the counter drums 2. The rods 10 of the rotating drums push the corn cobs along in the progressively narrowing space. The shelling of the corn cobs occurs as a result of their friction with the drums 3 and the counter drums 2 and between them. The shelled grain mixed with small pieces of shelled corn cobs pass through the grids of the counter drums 2 and fall on the screen 14. The shelled corn cobs brought out from the space between the drums 3 and the counter drums 2 also fall on upon the screen 14. The shelled grain passes through the screen 14 while the corn cobs do not. The shelled corn cobs and the separated large size impurities are removed along the screens 14 out of the device via the chute 16, and the grain passes through the screen 14 to the chute 18.

If coupling the maize sheller with an aspiration system, the light impurities are blown away by the fan 15 and are taken up by suction and brought away by the chute 17. In case of penetration of foreign matter in the space between the counter drum 2 and the drum 3 and if it is impossible to be pushed away with the corn cobs, large stresses arise in the area of the sector 5 causing a rupture of the safety pin 26 and the sector 5 rotates around its articulation joint 36 and the foreign matter falls through the formed aperture in the counter drum 2 upon the screens 14 and is brought out with the large size impurities through chute 16.

The outlet aperture between the drum 3 and the adjustable part 6 of the counter drum 2 is pre-adjusted according to the qualities of the input material (the size of the corn cobs) by the rotation of the flange 22, which is aided by screw 30 as shown in FIG. 9.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. In a maize sheller comprising
   a receiving hopper, a drum arrangement, an output chute, and a waste chute;
   said drum arrangement comprising a cylindrical rod drum and a conical rod counter drum, said cylindrical drum being arranged coaxial with and surrounded by said counter drum, said conical counter drum having a large base and a small base, said large base being disposed adjacent said receiving hopper;

a screen located between said drum arrangement and said output chute, said screen defining a passage to said waste chute;

the rods of the cylindrical drum and the conical counter drum being disposed along a helicoidal line, the improvement comprising said conical counter drum comprising a non-adjustable stationary part and an adjustable part, said adjustable part comprising at least three sectors, said sectors each linked at one end by an articulation joint to the small base of the non-adjustable part of the conical counter drum and said sectors linked together at another end through a regulating means for regulating the clearance between the cylindrical drum and the adjustable part of the conical counter drum, the rods of the cylindrical drum and of the conical counter drum arranged along the helicoidal line forming with respective cylindrical and conical generatrices and angle ranging from 0 to 50 degrees, each of said sectors being provided with a regulating pin, and said regulating means for regulating clearance between said cylindrical drum and said adjustable part of the counter drum comprises a flange fitted frontally behind the adjustable part of the counter drum and mounted on profiled rollers said flange provided with eccentrically disposed slot shaped orifices, the regulating pins engaging said orifices, whereby rotation of said flange causes movement of said pins within said orifices, and movement of said pins, in turn, causing movement of said sectors.

2. A maize sheller as claimed in claim 1, further comprising a safety sector in the non-adjustable part of the conical counter drum, said safety sector attached at one end by an articulation joint and at another end by a safety bolt.

3. A maize sheller as claimed in claim 1, wherein said regulating means further comprises a screw and a fork, said fork fixed to said flange, said fork carrying a nut, and said screw engaging said nut, whereby rotation of said screw causes rotation of said flange.

4. In a maize sheller comprising a receiving hopper, a drum arrangement having an inlet and an outlet, an output chute, and a waste chute;

said drum arrangement comprising a cylindrical rod drum and a conical rod counter drum, said cylindrical drum being arranged coaxial with and surrounded by said counter drum, said conical counter drum having a large base and a small base, said large base being disposed adjacent said receiving hopper;

a screen located between said drum arrangement and said output chute, said screen defining a passage to said waste chute;

the rods of the cylindrical drum and the conical counter drum being disposed along a helicoidal line, the improvement comprising said conical counter drum comprising a non-adjustable stationary part and an adjustable part, said adjustable part comprising at least three sectors, said sectors each linked at one end by an articulation joint to the small base of the non-adjustable part of the conical counter drum and said sectors linked together at another end through a regulating means for regulating the clearance between the cylindrical drum and the adjustable part of the conical counter drum, the rods of the cylindrical drum and of the conical counter drum arranged along the helicoidal line forming with respective cylindrical and conical generatrices an angle ranging from 0 to 50 degrees, wherein the clearance between the rods of the cylindrical drum and the rods of the adjustable part of the counter drum at said outlet of said drum arrangement ranges from 20 to 35 mm.

* * * * *